(12) United States Patent
Cox

(10) Patent No.: US 7,827,280 B2
(45) Date of Patent: Nov. 2, 2010

(54) SYSTEM AND METHOD FOR DOMAIN NAME FILTERING THROUGH THE DOMAIN NAME SYSTEM

(75) Inventor: Alan Cox, Guildford (GB)

(73) Assignee: Red Hat, Inc., Raleigh, NC (US)

( * ) Notice: Subject to any disclaimer, the term of this patent is extended or adjusted under 35 U.S.C. 154(b) by 626 days.

(21) Appl. No.: 11/363,157

(22) Filed: Feb. 28, 2006

(65) Prior Publication Data

US 2007/0204040 A1 Aug. 30, 2007

(51) Int. Cl.
*G06F 15/16* (2006.01)
(52) U.S. Cl. .......... 709/225; 709/206; 709/217; 709/219; 709/229; 709/245; 726/2; 726/21; 707/E17.109
(58) Field of Classification Search ........... 709/225, 709/226, 206, 217, 219, 229, 245; 726/2, 726/21; 707/E17.109
See application file for complete search history.

(56) References Cited

U.S. PATENT DOCUMENTS

| | | | | |
|---|---|---|---|---|
| 5,805,820 | A * | 9/1998 | Bellovin et al. | 709/225 |
| 5,848,233 | A * | 12/1998 | Radia et al. | 726/13 |
| 5,884,033 | A * | 3/1999 | Duvall et al. | 709/206 |
| 5,944,787 | A * | 8/1999 | Zoken | 709/206 |
| 6,211,871 | B1 * | 4/2001 | Himmel et al. | 715/744 |
| 6,321,267 | B1 * | 11/2001 | Donaldson | 709/229 |
| 6,457,061 | B1 * | 9/2002 | Bal et al. | 709/245 |
| 6,604,130 | B2 * | 8/2003 | Donoho et al. | 709/204 |
| 6,605,120 | B1 * | 8/2003 | Fields et al. | 715/239 |
| 6,658,463 | B1 * | 12/2003 | Dillon et al. | 709/219 |
| 6,772,214 | B1 * | 8/2004 | McClain et al. | 709/229 |
| 6,988,126 | B2 * | 1/2006 | Wilcock et al. | 709/204 |
| 7,149,189 | B2 * | 12/2006 | Huntington et al. | 370/235 |
| 7,149,219 | B2 * | 12/2006 | Donahue | 370/392 |
| 7,219,131 | B2 * | 5/2007 | Banister et al. | 709/206 |
| 7,406,708 | B2 * | 7/2008 | Shuster | 726/4 |
| 7,490,350 | B1 * | 2/2009 | Murotake et al. | 726/11 |
| 7,725,602 | B2 * | 5/2010 | Liu et al. | 709/245 |
| 2001/0052007 | A1 * | 12/2001 | Shigezumi | 709/223 |
| 2002/0143955 | A1 * | 10/2002 | Shimada et al. | 709/227 |
| 2003/0135411 | A1 * | 7/2003 | Ushiki et al. | 705/14 |
| 2004/0167991 | A1 * | 8/2004 | Stowe et al. | 709/248 |
| 2005/0022031 | A1 * | 1/2005 | Goodman et al. | 713/201 |
| 2006/0064469 | A1 * | 3/2006 | Balasubrahmaniyan et al. | 709/218 |

* cited by examiner

*Primary Examiner*—Alina N. Boutah
(74) *Attorney, Agent, or Firm*—MH2 Technology Law Group LLP

(57) ABSTRACT

A system and method of filtering a domain name through the DNS includes a domain name processing application that generates a filtering domain name based on a filter service to a domain name. A DNS resolver sends the filtering domain name to a filter service through the DNS. The filter service determines if the filtering domain name is approved and returns a DNS record indicating whether the domain name is approved. The DNS resolver receives the DNS record from the filter service and sends a response to the user.

41 Claims, 6 Drawing Sheets

SYSTEM AND METHOD FOR DOMAIN NAME FILTERING THROUGH THE DOMAIN NAME SYSTEM

FIELD OF THE INVENTION

The present invention relates to domain name filtering and, more particularly, to a system and method for domain name filtering through the Domain Name System.

BACKGROUND OF THE RELATED ART

The Domain Name System (DNS) is a distributed database used by Transport Control Protocol/Internet Protocol (TCP/IP) applications to map between domain names and internet protocol (IP) addresses, and to provide electronic mail routing information. The DNS uses a hierarchical naming scheme known as domain names, which are associated with each TCP/IP server. The DNS provides a protocol that allows each DNS server to communicate with each other to map between domain names and IP addresses. An explanation of the DNS protocol can be found various standards and Requests for Comment ("RFCs") well known to those skilled in the art, which are hereby incorporated by reference. For example, RFC 974 by C. Partridge, January 1986, entitled "Mail Routing and the Domain System," describes the use of DNS for mail routing. RFC 1034 by P. Mockapetris, November 1987, entitled "Domain Names—Concepts and Facilities," describes the use domain style names, their use for Internet mail and host address support, and the protocols and servers used to implement domain name facilities. RFC 1035 by P. Mockapetris, November 1987, entitled "Domain Names Implementation and Specification," describes the details of the domain system and protocol, such as the concept of returning textual data. RFC 1464 "Using The Domain Name System To Store Arbitary String Attributes," describes proposes the use of the DNS TXT resource record (defined in RFC 1035) to contain new types of information.

Filtering undesirable content on the Internet depends upon content providers labeling their content so that it can be filtered accordingly. Many less reputable content providers, however, do not bother to label their content and others may label their content in ways that reflect a cultural bias and assumptions. For example, Western Europe and the United States may have different biases on content that includes nudity and violence. In addition, others may define undesirable material in their own way, perhaps influenced by religious or political beliefs.

What is desired is a system and method for filtering undesirable content on the Internet that takes into account individual cultural biases and assumptions and permits existing infrastructure to be used.

SUMMARY

An embodiment generally relates to a method of filtering a domain name through a domain name system (DNS). The method includes generating a filtering domain name based on a domain name associated with the filter service and sending the filtering domain name to a filter service through the DNS. The method also includes receiving a DNS record from the filter service through the DNS indicating whether the domain name is approved by the filter service.

Another embodiment pertains generally to a method of filtering a domain name through a DNS. The method includes generating a set of filtering domain names based on a set of domain names associated with a set of filter services and sending the set of filtering domain names to the set of filter services through the DNS. The method also includes receiving a set of DNS records from the set of filter services through the DNS, where each DNS record indicating whether the domain name is approved by its corresponding filter service.

Yet another embodiment relates generally to a method of filtering a domain name through a DNS. The method includes receiving a DNS query comprising a domain name and comparing the domain name to a database comprising a set of domain names to determine an approval status of the domain name. The method also includes sending a DNS record indicating whether the domain name is approved in response to the DNS query.

Yet another embodiment relates generally to a system for filtering a domain name through a DNS. The system includes a central processing unit and a domain name processing application configured for execution by the central processing unit. The domain name processing application includes computer program instructions for generating a filtering domain name based on a domain name associated with a filter service. The system also includes a DNS resolver configured for execution by the central processing unit comprising program instructions for sending the filtering domain name to a filter service through the DNS and for receiving a DNS record from the filter service through the DNS indicating whether the domain name is approved by the filter service.

Yet another embodiment pertains generally to a system of filtering a domain name through a DNS. The system includes a database comprising a set of domain names and a database server for interfacing with the database. The database server includes a central processing unit and a DNS interface for receiving a DNS query, the DNS query comprising a domain name, and for sending a DNS record indicating whether the domain name is approved in response to the DNS query. The database server also includes a memory that includes program instructions for execution by the central processing unit for comparing the domain name to the set of domain names in the database to determine an approval status of the domain name.

Additional features of the invention will be set forth in part in the description which follows, and in part will be obvious from the description, or may be learned by practice of the invention. The features of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Embodiments of the present invention provide systems and methods for filtering online content available from a network, such as the Internet. When content is requested, the domain name for that content is received from a user through a browser. The request is forwarded to a filter server, which adds a secondary domain name for a filter service associated with the requested domain name. Each domain name may have one or more filter services associated with it.

After adding the secondary domain name, the filter server sends a DNS query service to the filter service. The filter service parses the request, determines the domain of the requested content and compares it to a database of domain names to determine if the domain name is approved. The filter service can approve domain names according to specific preferences, such as preferences related to religion or a specified age group. The filter service returns a DNS record indicating whether the domain name is approved.

The filter server receives the DNS record from the filter service and sends a response to the user. If the domain name has been approved, the response can include the content, e.g., a web page, requested by the user. If the domain name has not been approved, the response can include a text message explaining why the domain name has not been approved. Alternatively, the response may be rating information, such as a label consistent with the Platform for Internet Content Selection (PICS) specification. The browser or locally enforced policy may then applied based on the rating indicated in the response.

The filter server can communicate with multiple filter services by generating multiple filtering domain names to send to multiple filter services through the DNS. This allows domain names to be filtered according to various preferences. If one of the filter services returns a DNS record indicating that the domain name is not approved, the filter server can send a response to the user explaining why the domain name has not been approved.

Reference will now be made in detail to the exemplary embodiments of the invention, examples of which are illustrated in the accompanying drawings. Wherever possible, the same reference numbers will be used throughout the drawings to refer to the same or like parts.

Figure 1:
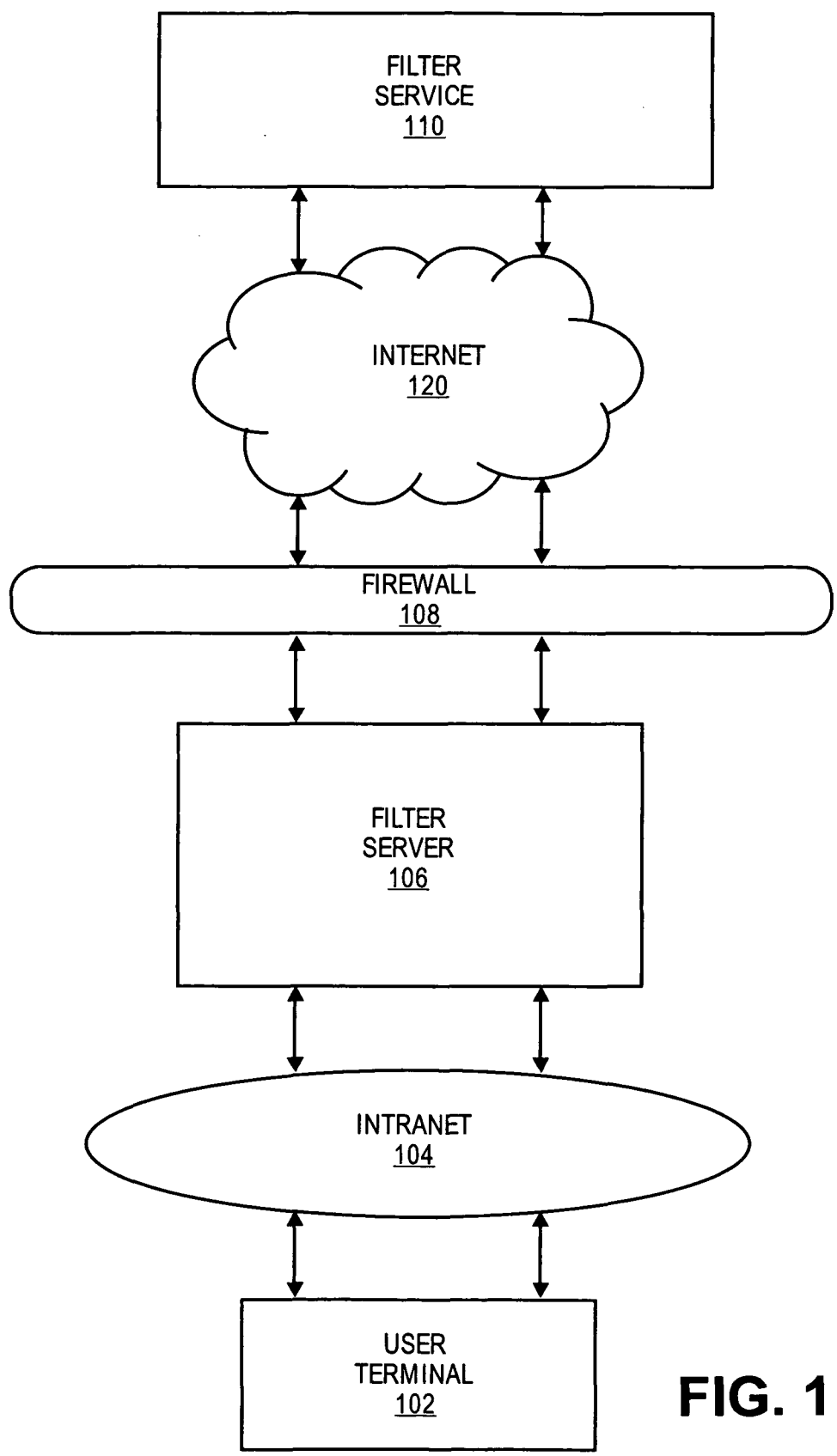
FIG. 1 depicts a block diagram of an exemplary system environment, in accordance with systems and methods consistent with the present invention.

FIG. 1 depicts a block diagram of an exemplary system environment, in accordance with systems and methods consistent with the present invention. As illustrated, a network 104 connects a user terminal 102 with a filter server 106. Network 104 may be, for example, an internal network. For ease in explanation, network 104 will be hereinafter referred to as intranet 104. One of skill in the art will recognize, however, that intranet 104 in other embodiments may be any type of communication medium or channel and may include, alone or in any suitable combination, a telephony-based network, a local area network (LAN), a wide area network (WAN), a dedicated intranet, the Internet, a wireless network, or a bus. Moreover, in one embodiment, intranet 104 may include or be a part of a communications network, such as the Internet or a corporate intranet that is compatible with a networking protocol such as TCP/IP. User terminal 102 may be any type of a user terminal, and may be for example, a user computer or data processor executing a web browser type program, such as Microsoft's Internet Explorer or a Netscape browser. Accordingly, user terminal 102 may include a processor, memory, storage, and an interface for connecting to intranet 104.

Figure 2:
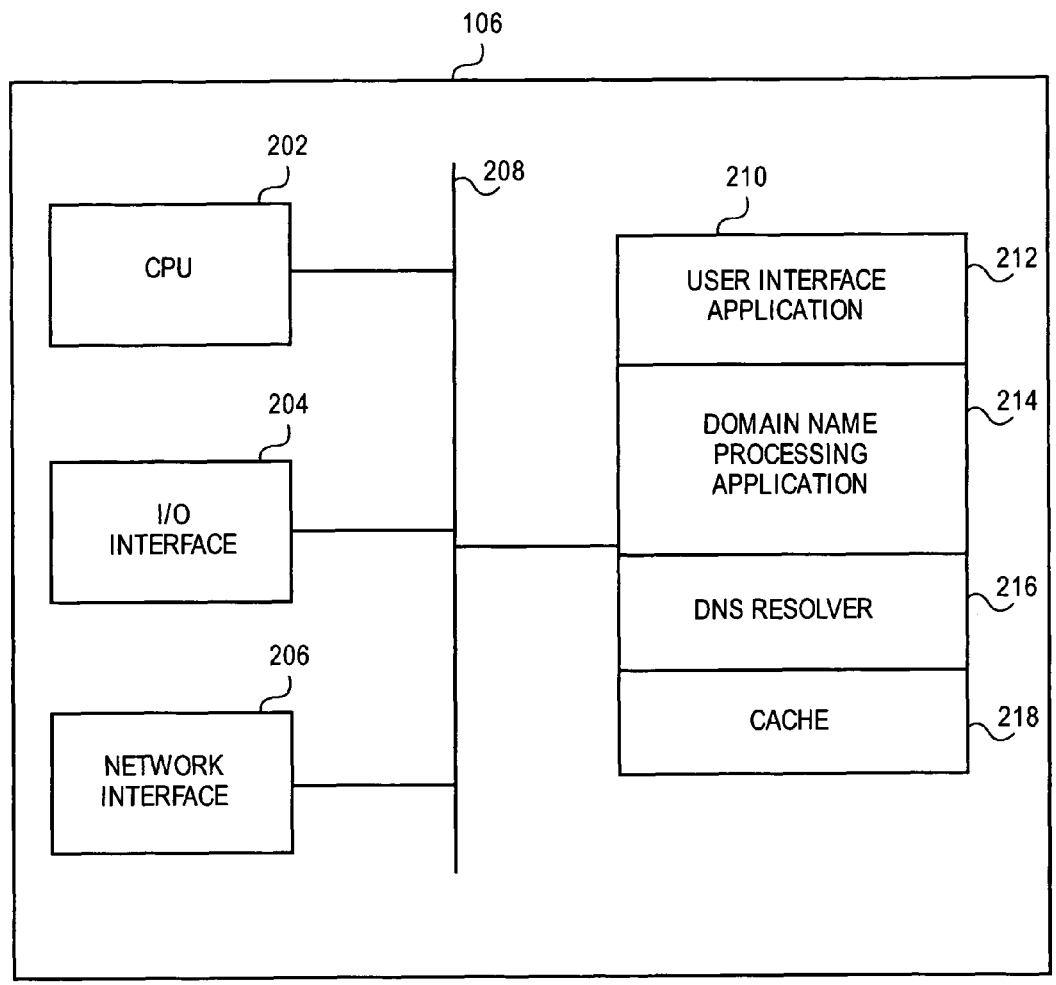
FIG. 2 depicts a block diagram of an exemplary filter server 106, in accordance with systems and methods consistent with the present invention.

As described in detail regarding FIG. 2, filter server 106 functions to receive a DNS query from user terminal 102, reformat the query, send out the reformatted query to at least one filter service, and provide a response to user terminal 102. Filter server 106 connects to network 120 via a firewall 108. Firewall 108 may be any appropriate type of firewall, such as, for example, commercially available firewalls. Network 120 may be implemented through any suitable combination of wired and/or wireless communication networks. For example, network 120 may be implemented through a wide area network (WAN), local area network (LAN), an intranet and/or the Internet. Additionally, network 120 may utilize any suitable type of network protocol. For ease of explanation, network 120 will be hereinafter referred to as Internet 120 and will be assumed to use TCP/IP.

Figure 3:
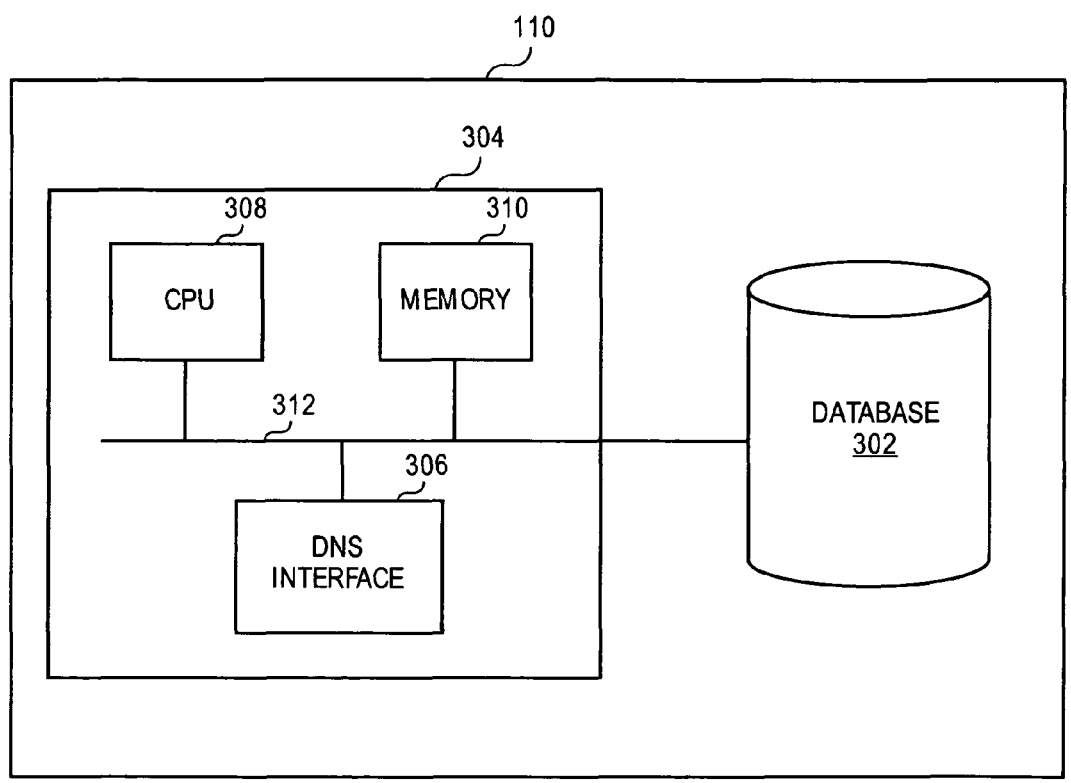
FIG. 3 depicts a block diagram of an exemplary filter service 110, in accordance with systems and methods consistent with the present invention.
Figure 6:
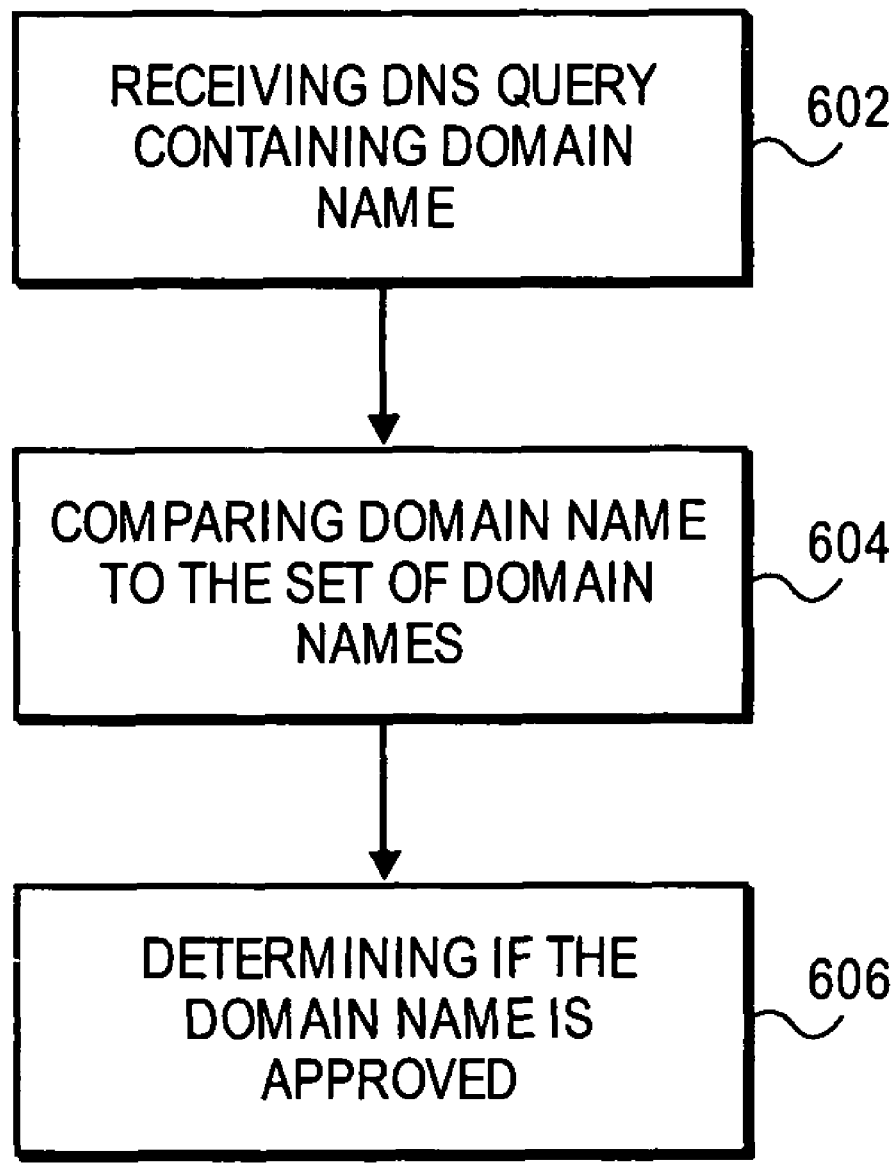
FIG. 6 depicts a flow diagram of an exemplary domain name filter process, in accordance with systems and methods consistent with the present invention.

Filter server 106 communicates with filter service 110 over Internet 120 as described in detail regarding FIGS. 3 and 6. Filter service 110 filters domain names according to various preferences. For example, filter service 110 can filter domain names based on religious preferences, or based on preferences related to a specified age group.

FIG. 2 depicts a block diagram of an exemplary filter server 106, in accordance with systems and methods consistent with the present invention. Filter server 106 may be embodied as a data processor, such as a computer, that functions to filter undesirable domain names. Filter server 106 includes at least one central processing unit (CPU) 202, an I/O interface 204, a network interface 206, and memory 210. CPU 202 executes instructions associated with the applications contained in memory 210 and transmits results to other subsystems in filter server 106 over a high speed interconnect or data bus 208. I/O interface 204 is an interface used to couple filter server 106 with devices such as a keyboard, a mouse, a display device, and any other I/O device useful in operating and managing filter server 106 as is understood by one of skill in the art. Network interface 206 is used to communicate with intranet 104 and Internet 120 (FIG. 1).

Memory 210 includes in one embodiment: a user interface application 212 having program instructions that when executed interface with user terminal 102; a domain name processing application 214 having program instructions that when executed process received domain names; a DNS resolver 216 having program instructions that when executed interface with the DNS; and a cache 218 for storing data associated with requested web pages.

FIG. 3 depicts a block diagram of an exemplary filter service 110, in accordance with systems and methods consistent with the present invention. Filter service 110 may be implemented as a database 302 connected to a database server 304 by a high speed interconnect or data bus 312. Database 302 may store information, such as a set of domain names, which can be accessed through a conventional database protocol, such as Structured Query Language (SQL). Database server 304 may be implemented as a computer or data processor for accessing, searching, and/or processing the set of domain names. Database server 304 includes a central processing unit 308, a memory 310 that includes program instructions configured for execution by the central processing unit 308 for operating database server 304, and a DNS interface 306 for interfacing with the DNS.

FIG. 6 depicts a flow diagram of an exemplary domain name filter process, in accordance with systems and methods consistent with the present invention. The flow diagram will be described with reference to the embodiment of the system depicted in FIG. 3. In one embodiment, database 302 includes a set of domain names that are not approved. In another embodiment, database 302 includes a set of domain names that are approved. DNS interface 306 receives (step 602) a query from filter server 106. As described below, the query includes a domain name requested by a user. Database server 304 can then look up the domain name in database 302 to compare (step 604) it to the set of domain names and determine (step 606) if the domain name is approved. In one embodiment, if database 302 includes a set of domain names that are not approved and if the requested domain name is found in database 302, DNS interface 306 returns a DNS record to filter server 106 (FIG. 1) indicating the domain name is not approved. If the domain name is not found in database 302, DNS interface 306 returns a DNS record to filter server 106 that the domain name is approved. In an alternative embodiment, if database 302 includes a set of domain names that are approved and the requested domain name is found in database 302, DNS interface 306 returns a DNS record to filter server 106 indicating the domain name is approved. If the domain name is not found in database 302, DNS interface 306 returns a DNS record to filter server 106 that the domain name is not approved.

In one embodiment, the DNS record that the domain name is not approved can include a text file containing the reason the domain name is not approved. For example, the text file may read "This Domain has been placed on a block list for containing inappropriate content." The DNS record that the domain name is approved can include an indication, such as an error message, that the domain name is approved.

Figure 4:
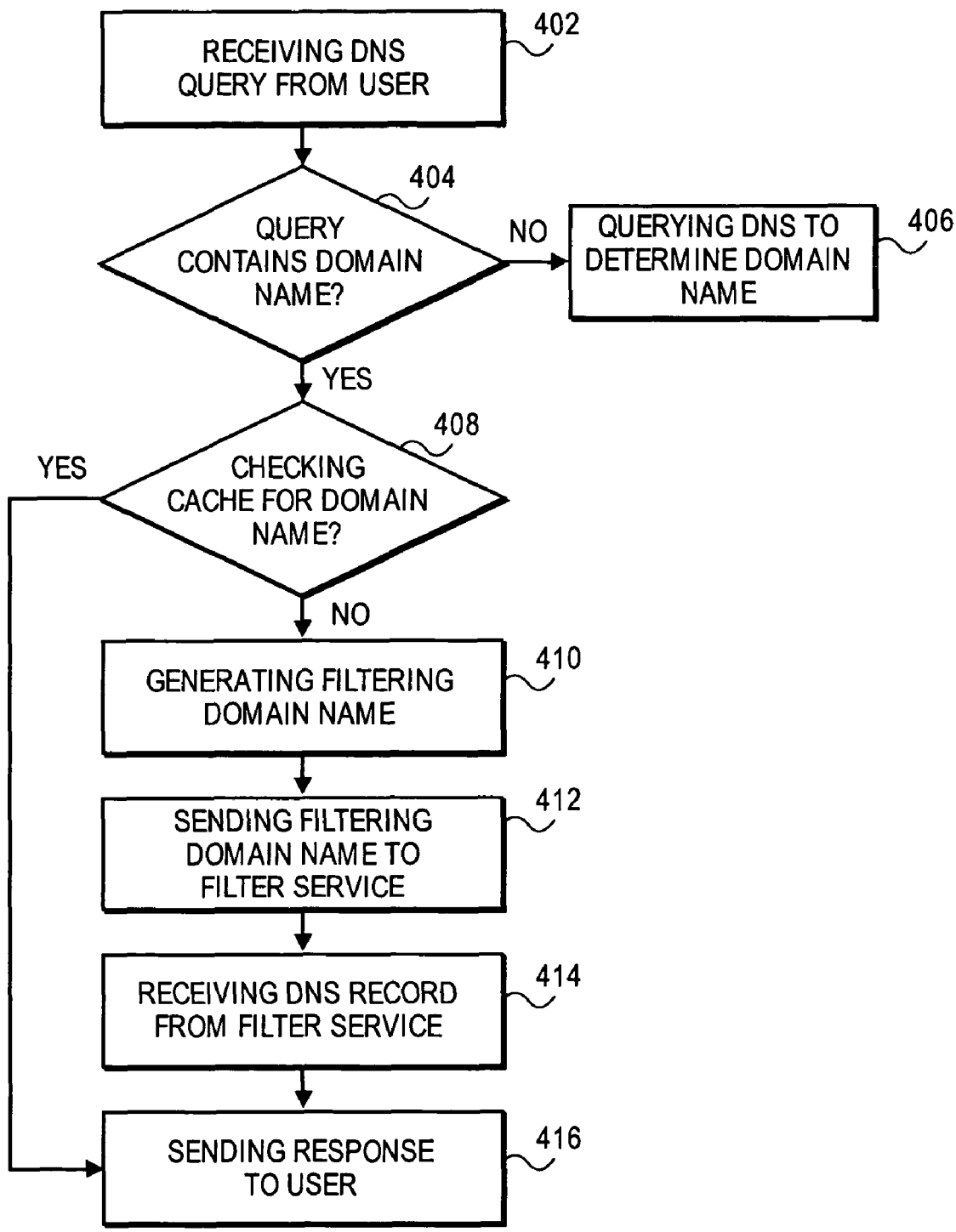
FIG. 4 depicts a flow diagram of an exemplary domain name filter process, in accordance with systems and methods consistent with the present invention.

FIG. 4 depicts a flow diagram of an exemplary domain name filter process, in accordance with systems and methods consistent with the present invention. The flow diagram will be described with reference to the embodiment of the system depicted in FIGS. 1 and 2. In one embodiment, user interface application 212 receives (step 402) a DNS query from user terminal 102. If the query contains (step 404) a domain name, user interface application 212 initiates domain name processing application 214. If the query contains (step 404) an IP address rather than a domain name, user interface application 212 initiates DNS resolver 216. DNS resolver 216 queries the DNS to determine (step 406) the domain name associated with the IP address as is understood by one of skill in the art. DNS resolver 216 returns the domain name to user interface application 212.

Cache 218 can store data related to previous domain name requests. Thus, if a domain name has been previously requested by user terminal 102, cache 218 can store the response for a specified amount of time. In one embodiment, the amount of time can be specified by user terminal 102 in the DNS query, as is understood by one of skill in the art. User interface application 212 can check (step 408) cache 218 for a requested domain name before sending out a query to the DNS. Cache 218 can store the response associated with the requested domain name returned from filter service 110. As described in detail below, in one embodiment, the response can include the web page associated with the requested domain name if the domain name is approved; and, if the domain name is not approved, the response can include a text message indicating that the domain name is not approved or a rating, such as a PICS label. Thus, if the requested domain name has been previously requested and is stored in cache 218, user interface application 212 can send (step 416) user terminal 102 the response stored in cache 218.

Once user interface application 212 has received the domain name associated with the DNS query from user terminal 102, user interface application 212 initiates domain name processing application 214. Domain name processing application 214 adds a domain name associated with filter service 110 to the requested domain name to generate (step 410) a filtering domain name. For example, if the requested domain name is www.example.com and filter service 110 has the associated domain name filterservice.com, domain name processing application 214 would add the filter domain name filterservice.com to www.example.com. Therefore, the result would be the filtering domain name www.example.com.filterservice.com.

Domain name processing application 214 initiates DNS resolver 216 to send (step 412) the filtering domain name to filter service 110 through the DNS. As described above, DNS resolver 216 receives (step 414) a DNS record from filter service 110 indicating either that the domain name is approved by filter service 110 or that the domain name is not approved by filter service 110.

User interface application 212 reads the DNS record received by DNS resolver 216 and sends (step 416) a response to user terminal 102 based on the DNS record. If the received DNS record indicates that the requested domain name is not approved by filter service 110, user interface application 212 sends a response to user terminal 102 that the requested domain name is not approved. In one embodiment, user interface application 212 sends a text message, which was included in the received DNS record, or a rating, such as a PICS label, to user terminal 102. If the received DNS record indicates that the requested domain name is approved by filter service 110, user interface application 212 can download the requested web page and send it to user terminal 102. In one embodiment, user interface application 212 can download the requested web page by initiating DNS resolver 216 to determine the IP address and then sending a request to the host as is understood by one of skill in the art.

Figure 5:
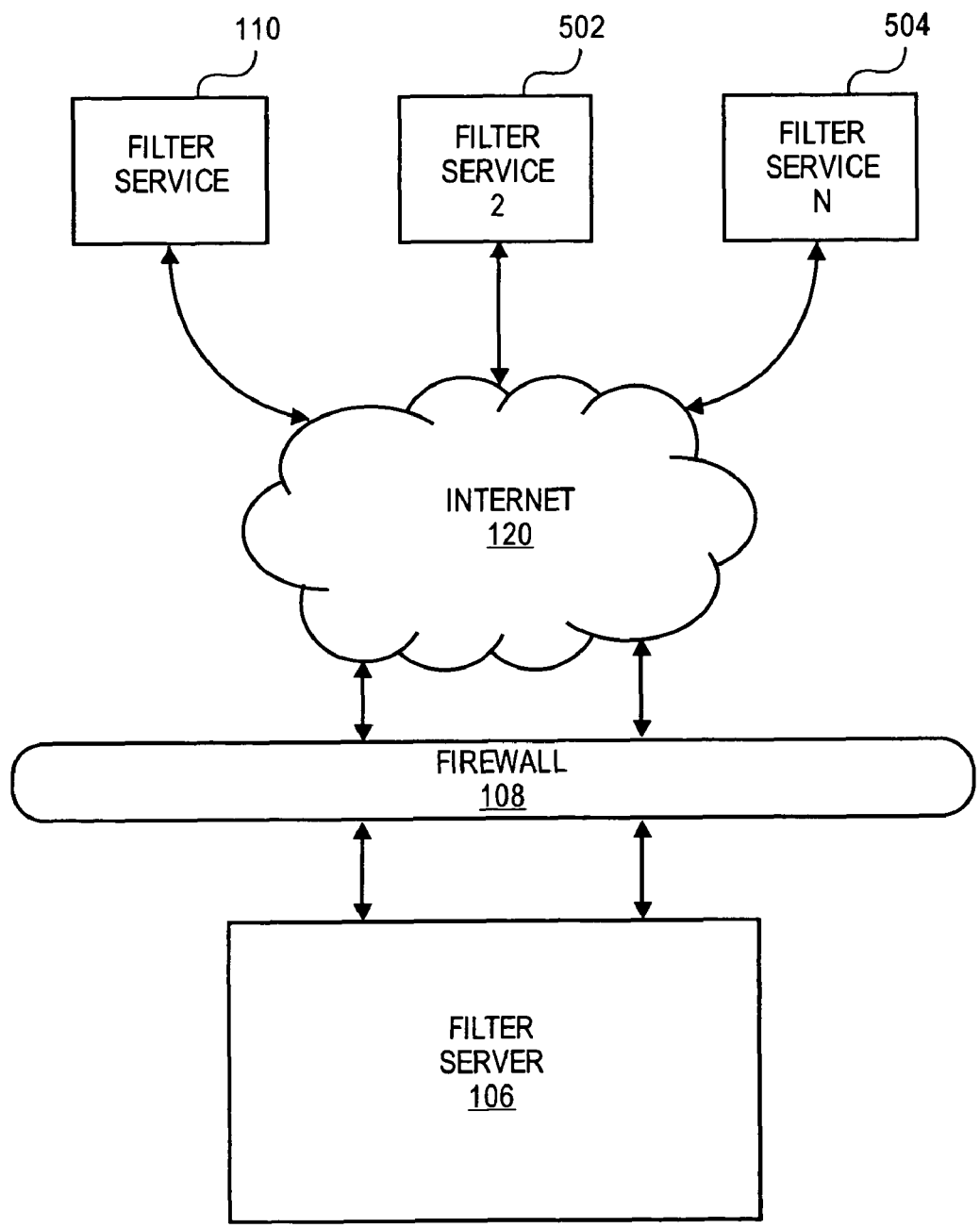
FIG. 5 depicts a block diagram of an exemplary domain name filtering system that includes multiple filter services, in accordance with systems and methods consistent with the present invention.

FIG. 5 depicts a block diagram of an exemplary domain name filtering system that includes multiple filter services, in accordance with systems and methods consistent with the present invention. The system depicted in FIG. 5 includes filter service 2 502 and filter service N 504. Multiple filter services allows for domain names to be filtered according to multiple filtering preferences. For example, filter service 110 can filter domain names according to religious preferences, while filter service 2 502 can filter domain names according to preferences related to age group. Domain name processing application 214 can add additional filter domain names associated with additional filter services to the requested domain name. Thus, if filter service 2 has an associated domain name of filterservice2.com, domain name processing application 214 can generate the filtering domain name www.example.com.filterservice2.com and if filter service N 404 has an associated domain name of filterserviceN.com, domain name processing application 214 can generate the filtering domain name www.example.com.filterserviceN.com. DNS resolver 216 can send multiple queries (for responses from multiple filter services) to each filter service 110, 502, and 504 in parallel using the DNS protocol as is understood by one of skill in the art. User interface application 212 can send a response to user terminal 102 that the domain name is not approved if any one of the filter services 110, 502, and 504 send a DNS response that the domain name is not approved. User interface application 212 in the response to user terminal 102 can indicate which filter service did not approve of the domain name.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of filtering a domain name through a domain name system (DNS) comprising:
   receiving, at a filter server, the domain name to be filtered;
   adding, to the domain name, a domain name of a filter service to generate a filtering domain name, wherein the filter service approves or disapproves the domain name;
   sending the filtering domain name to the filter service through the DNS; and
   receiving a DNS record from the filter service through the DNS indicating whether the domain name is approved by the filter service.

2. The method of claim 1, wherein the domain name is received from a user.

3. The method of claim 2 further comprising sending a response to the user based on the received DNS record.

4. The method of claim 3 wherein the response is a web page associated with the domain name if the domain name is approved by the filter service.

5. The method of claim 3 wherein the response is a text message explaining that the domain name is not approved if the domain name is not approved by the filter service.

6. The method of claim 3 wherein the response indicates a rating for the domain name.

7. The method of claim 1 further comprising checking a memory cache to determine if a response associated with the filtering domain name is stored in the memory cache.

8. The method of claim 7 further comprising sending a user the response stored in the memory cache based on the response being stored in the memory cache.

9. The method of claim 7 wherein the memory cache comprises a set of responses associated with a set of domain names that have been previously requested within an amount of time.

10. The method of claim 1 further comprising receiving an IP address from a user.

11. The method of claim 10 further comprising querying the DNS to determine a domain name corresponds to the IP address.

12. A method of filtering a domain name through a domain name system (DNS) comprising:
    receiving, at a filter server the domain name to be filtered;
    generating a set of filtering domain names, wherein each filtering domain name in the set of filtering domain names is generated by adding the domain name to a domain name of one filter service in a set of filter services, and wherein the set of filter services approve or disapprove the domain name;
    sending the set of filtering domain names to the set of filter services through the DNS; and
    receiving a set of DNS records from the set of filter services through the DNS, each DNS record indicating whether the domain name is approved by its corresponding filter service.

13. The method of claim 12 wherein the set of filtering domain names are sent in parallel.

14. The method of claim 12 further comprising sending a response to a user based on the received set of DNS records.

15. The method of claim 14 wherein the response is a web page associated with the domain name if the domain name is approved by each one of the set of filter services.

16. The method of claim 14 wherein the response is a text message indicating that the domain name is not approved if the domain name is not approved by at least one of the set of filter services.

17. The method of claim 16 wherein the text message further identifies the at least one of the set of filter services that did not approve the domain name.

18. The method of claim 14 wherein the response is a rating for the domain name.

19. A method of filtering a domain name through a domain name system (DNS) comprising:
    receiving, at a filter service, a filtering domain name comprising the domain name added to a domain name of the filter service;
    extracting the domain name to be filtered from the filtering domain name;
    comparing the domain name to a database comprising a set of domain names to determine an approval status of the domain name; and
    sending a record indicating whether the domain name is approved.

20. The method of claim 19 wherein the set of domain names comprises a set of domain names that are approved.

21. The method of claim 20 wherein the record comprises a text message indicating that the domain name is not approved if the domain name is not in the database.

22. The method of claim 20 wherein the record comprises an indication that the domain name is approved if the domain name is in the database.

23. The method of claim 19 wherein the set of domain names comprises a set of domain names that are not approved.

24. The method of claim 23 wherein the record comprises a text message indicating that the domain name is not approved if the domain name is in the database.

25. The method of claim 23 wherein the record comprises an indication that the domain name is approved if the domain name is not in the database.

26. A system for filtering a domain name through a domain name system (DNS) comprising:
    a central processing unit;
    a domain name processing application configured for execution by the central processing unit, wherein the domain name processing application comprises computer program instructions for receiving the domain name to be filtered, and adding, to the domain name, a domain name of a filter service to generate a filtering domain name, wherein the filter service approves or disapproves the domain name; and
    a DNS resolver configured for execution by the central processing unit comprising program instructions for sending the filtering domain name to the filter service through the DNS and for receiving a DNS record from the filter service through the DNS indicating whether the domain name is approved by the filter service.

27. The system of claim 26 further comprising a user interface application configured for execution by the central processing unit comprising program instructions for receiving the domain name from a user.

28. The system of claim 26 further comprising a user interface application configured for execution by the central processing unit comprising program instructions for sending a response to the user based on the received DNS record.

29. The system of claim 26 wherein the response is a web page associated with the domain name if the domain name is approved by the filter service.

30. The system of claim 28 wherein the response is a message explaining that the domain name is not approved if the domain name is not approved by the filter service.

31. The system of claim 26 further comprising a memory cache for storing a set of responses associated with a set of domain names that have been previously requested within an amount of time.

32. The system of claim 31 further comprising a user interface application configured for execution by the central processing unit comprising program instructions for sending a user a response stored the memory cache if the domain name is one of the previously requested domain names and the response is one of the set of responses.

33. The system of claim 26 further comprising a user interface application configured for execution by the central processing unit comprising program instructions for receiving an IP address from a user.

34. The system of claim 33 wherein the DNS resolver queries the DNS to determine a domain name corresponding to the IP address.

35. A system of filtering a domain name through a domain name system (DNS) comprising:
a database comprising a set of domain names;
a database server for interfacing with the database, the database server comprising:
a memory comprising instructions; and
a central processing unit coupled to the memory and configured to execute the instructions to receive a filtering domain name comprising the domain name added to a domain name of a filter service; to extract the domain name to be filtered from the filtering domain name; to compare the domain name to the set of domain names in the database to determine an approval status of the domain name; and to send a record indicating whether the domain name is approved.

36. The system of claim 35 wherein the set of domain names comprises a set of domain names that are approved.

37. The system of claim 36 wherein the record comprises a text message indicating that the domain name is not approved if the domain name is not in the database.

38. The system of claim 36 wherein the record comprises an indication that the domain name is approved if the domain name is in the database.

39. The system of claim 36 wherein the set of domain names comprises a set of domain names that are not approved.

40. The system of claim 39 wherein the record comprises a text message indicating that the domain name is not approved if the domain name is in the database.

41. The system of claim 39 wherein the record comprises an indication that the domain name is approved if the domain name is not in the database.

* * * * *